United States Patent
Sato

(10) Patent No.: US 8,635,369 B2
(45) Date of Patent: Jan. 21, 2014

(54) CONTENT TRANSMISSION SYSTEM, CONTENT SENDING APPARATUS AND METHOD, CONTENT RECEPTION APPARATUS AND METHOD, PROGRAM, AND RECORDING MEDIA

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/014,997

(22) Filed: Jan. 16, 2008

(65) Prior Publication Data

US 2008/0183809 A1  Jul. 31, 2008

(30) Foreign Application Priority Data

Jan. 30, 2007 (JP) ................. P2007-019779

(51) Int. Cl.
*G06F 15/16* (2006.01)
*H04L 29/06* (2006.01)

(52) U.S. Cl.
CPC ..................... *H04L 29/06* (2013.01)
USPC ......................................................... 709/246

(58) Field of Classification Search
USPC ............ 709/203, 204, 205, 206, 246; 386/69, 386/70
See application file for complete search history.

(56) References Cited

U.S. PATENT DOCUMENTS

| | | | |
|---|---|---|---|
| 6,269,431 B1 * | 7/2001 | Dunham | 711/162 |
| 2003/0196114 A1 | 10/2003 | Brew et al. | |
| 2004/0208480 A1 * | 10/2004 | Yoon et al. | 386/69 |
| 2005/0071871 A1 * | 3/2005 | Yuzawa | 725/48 |
| 2005/0144224 A1 * | 6/2005 | Togashi et al. | 709/203 |
| 2006/0015351 A1 * | 1/2006 | Epstein | 705/1 |
| 2006/0242152 A1 * | 10/2006 | Tanaka et al. | 707/10 |
| 2008/0091830 A1 | 4/2008 | Koshino et al. | |
| 2008/0134012 A1 * | 6/2008 | Kokes et al. | 715/201 |

FOREIGN PATENT DOCUMENTS

| | | |
|---|---|---|
| EP | 1 475 702 A2 | 11/2004 |
| GB | 2 394 570 A | 4/2004 |
| JP | 2004-173238 A | 6/2004 |
| JP | 2005-134975 | 5/2005 |
| WO | WO 2004/090753 A1 | 10/2004 |
| WO | WO 2005/013068 A2 | 2/2005 |
| WO | WO 2006/046446 A1 | 5/2006 |

OTHER PUBLICATIONS

European search report dated Apr. 19, 2011, for European Application No. 08250083.6, 3 pgs.

* cited by examiner

*Primary Examiner* — Peter Shaw
(74) *Attorney, Agent, or Firm* — Finnegan, Henderson, Farabow, Garrett & Dunner, L.L.P.

(57) ABSTRACT

A content transmission system has a content sending apparatus for sending content and a content reception apparatus for receiving content sent by the content sending apparatus. The content sending apparatus includes a metadata attaching unit, an execution processing insertion unit, and a data sending unit. The content reception apparatus includes a data reception unit, a metadata analysis unit, and a processing execution unit.

12 Claims, 12 Drawing Sheets

F I G . 3
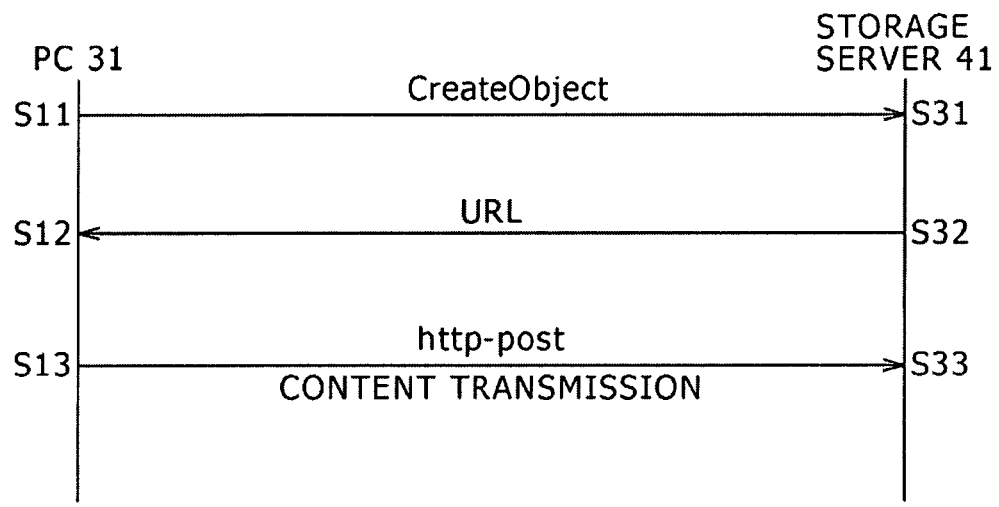

FIG. 4

```
SOAPACTION:"urn:schemas-upnp-org:service:ContentDirectory:1#CreateObject"
<?xml version="1.0"?>
<s:Envelop exmlns:s="http://schemas.xmlsoap.org/soap/envelope/"
s:encodingStyle="http://schemas.xmlsoap.org/soap/encoding/">
<s:Body>
<u:CreateObject.xmlns:u="urn:schemas-upnp-org:service:ContentDirectory:1">
<ContainerID>dvdrec</ContainerID>
<Elements>
********* XML message below *********
<?xml version="1.0"?>
<DIDL-Lite xmlns:dc=""http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/">
<item id="" parentID="dvdrec"restricted="0">
<dc:title>MPEG1 Sample Movie2</dc:title>
<upnp:class>object.item.videoItem</upnp:class>
<res
protocolInfo="*:*:application/x-dtcp1;DTCP1HOST=192.168.101.40;DTCP1PORT=6000;CONTENTFORMAT
=video/vnd.dlna.mpeg-tts:DLNA.ORG_PN=MPEG_TS_SD_EU_T;DLNA.ORG_OP=00"
size="128431694"></res>
</item>
</DIDL-Lite>
********* XML message above *********
</Elements>
```

```
SOAPACTION:"urn:schemas-upnp-org:service:ContentDirectory:1#CreateObject"
<?xml version="1.0"?>
<s:Envelop exmlns:s="http://schemas.xmlsoap.org/soap/envelope/"
s:encodingStyle="http://schemas.xmlsoap.org/soap/encoding/">
<s:Body>
<u:CreateObject.xmlns:u="urn:schemas-upnp-org:service:ContentDirectory:1">
<ContainerID>dvdrec</ContainerID>
<Elements>
********* XML message below **********
<?xml version="1.0"?>
<DIDL-Lite xmlns:dc=""http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/">
<item id="" parentID="dvdrec"restricted="0">
<dc:title>MPEG1 Sample Movie2</dc:title>
<upnp:class>object.item.videoItem</upnp:class>
<private:nextaction>copy-to-memorystick</private:nextaction>
<res
protocolInfo="*:*:application/x-dtcp1;DTCP1HOST=192.168.101.40;DTCP1PORT=6000;CONTENTFORMAT
=video/vnd.dlna.mpeg-tts;DLNA.ORG_PN=MPEG_TS_SD_EU_T;DLNA.ORG_OP=00"
size="128431694"></res>
</item>
</DIDL-Lite>
********* XML message above **********
</Elements>
```

SOAPACTION:"urn:schemas-upnp-org:service:ContentDirectory:1#CreateObject"
<?xml version="1.0"?>
<s:Envelop exmlns:s="http://schemas.xmlsoap.org/soap/envelope/"
s:encodingStyle="http://schemas.xmlsoap.org/soap/encoding/">
<s:Body>
<u:CreateObject xmlns:u="urn:schemas-upnp-org:service:ContentDirectory:1">
<ContainerID>dvdrec</ContainerID>
<Elements>
********* XML message below *********
<?xml version="1.0"?>
<DIDL-Lite xmlns:dc="""http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:dlna="urn:schemas-dlna-org:metadata-1-0/">
<item id="" parentID="dvdrec"restricted="0">
<dc:title>MPEG1 Sample Movie2</dc:title>
<upnp:class>object.item.videoItem</upnp:class>
<private:nextaction>lifetime=24hours</private:nextaction>
<res
protocolInfo="*:*:application/x-dtcp1;DTCP1HOST=192.168.101.40;DTCP1PORT=6000;CONTENTFORMAT
=video/vnd.dlna.mpeg-tts:DLNA.ORG_PN=MPEG_TS_SD_EU_T;DLNA.ORG_OP=00"
size="128431694"></res>
</item>
</DIDL-Lite>
********* XML message above *********
</Elements>
```

410
421
422
423
431

CONTENT TRANSMISSION SYSTEM, CONTENT SENDING APPARATUS AND METHOD, CONTENT RECEPTION APPARATUS AND METHOD, PROGRAM, AND RECORDING MEDIA

CROSS REFERENCES TO RELATED APPLICATIONS

The present invention contains subject matter related to Japanese Patent Application JP 2007-019779 filed with the Japan Patent Office on Jan. 30, 2007, the entire contents of which being incorporated herein by reference.

BACKGROUND OF THE INVENTION

1. Field of the Invention

The present invention relates to a content transmission system, a content sending apparatus and method, a content reception apparatus and method, a program and a recording media and, more particularly to a content transmission system, a content sending apparatus and method, a content reception apparatus and method, a program, and a recording media that are configured to execute content-associated processing in networked devices more easily than related-art technologies.

2. Description of the Related Art

Recently, technologies are gaining popularity in which personal computers, peripheral devices thereof, AV equipment, telephones, electric appliances, for example, in homes are interconnected by use of a network to mutually provide functions. One of the technological specifications that support such a network is UPnP (Universal Plug and Play) for example.

UPnP is intended to function on the basis of Internet-standard technologies by only connecting to networks, without involving any complicated operations and setting works. For example, UPnP specifies the processing of uploading content from terminals connected to a network to a server connected thereto.

Also, recently, it has become practicable to view recorded images for example on portable display devices. To be more specific, content uploaded in a server can be downloaded to a removable media, which is loaded on a portable display device to reproduce the downloaded content, for example.

In addition, as disclosed in Japanese Patent Laid-open No. 2005-134975 below, technologies are proposed in which a server receives the specification information of one or more audio reproducing devices that distribute information signals and distributes audio content stored in a content storage hard disk of the server to each of these audio reproducing devices specified by the received specification information, thereby allowing each of the audio reproducing devices to reproduce the audio content at the same time.

SUMMARY OF THE INVENTION

Reproducing images on a portable display device demands the changing of image compression coding algorithms of image data, for example. To be more specific, the image data received by a television receiver for example is often compressed by MPEG2, while the image data reproducible on portable display devices is often compressed by MPEG4, so that it is demanded for the content uploaded to servers to be compressed by a data compression coding algorithm that allows the reproduction on portable display devices and the data thus compressed to be recorded to removable media, for example.

If a content-uploading user uploads content to devices, such as servers, for example, the uploaded content may often be recorded to recording media, such as removable media, for example.

However, in the UPnP-specified processing, content uploading processing and uploaded content recording processing demand separate operations, which are complicated and time and labor consuming for the user to carry out.

Therefore, the present invention addresses the above-identified and other problems associated with related-art methods and apparatuses and solves the addressed problems by providing a content transmission system, a content sending apparatus and method, a content reception apparatus and method, a program and a recording media that are configured to execute content-associated processing in networked devices more easily than related technologies.

In carrying out the invention and according to a first embodiment thereof, there is provided a content transmission system having a content sending apparatus for sending content and a content reception apparatus for receiving content sent by the content sending apparatus. This system is made up of the content sending apparatus and the content reception apparatus. The content sending apparatus has a metadata attaching unit configured to attach information associated with metadata of the content to data of the content; an execution processing insertion unit configured to insert a description associated with processing to be executed by the content reception apparatus after reception of the content by the content reception apparatus has been completed into metadata to be attached to data of the content; and a data sending unit configured to send, to the content reception apparatus, the data of the content attached with the metadata with the description inserted by the execution processing insert-on unit. The content reception apparatus has a data reception unit configured to receive the data of the content attached with the metadata; a metadata analysis unit configured to analyze the metadata received by the data reception unit; and a processing execution unit configured to execute processing to be executed after completion of reception of the content on the basis of a result of the analysis by the metadata analysis unit.

In the first embodiment of the invention, the information about the metadata of the content is attached to the content data by the content sending apparatus. When the reception of the content by the content reception apparatus has been completed, the description associated with the processing to be executed by the content reception apparatus is inserted in the metadata to be attached to the content data and the content data attached with the metadata inserted with the description is sent to the content reception apparatus. The content data attached with the metadata is received by the content reception apparatus, the metadata is analyzed, and, on the basis of a result of the analysis, the processing to be executed is processed after the completion of the reception of the above-mentioned content.

In carrying out the invention and according to the second embodiment of thereof, there is provided a content sending apparatus for sending content to a content reception apparatus for receiving the content. This content sending apparatus has a metadata attaching unit configured to attach information associated with metadata of the content to data of the content; an execution processing insertion unit configured to insert a description associated with processing to be executed by the content reception apparatus after reception of the content by the content reception apparatus has been completed into metadata to be attached to data of the content; and a data sending unit configured to send, to the content reception apparatus, the data of the content attached with the metadata with the description inserted by the execution processing insertion unit.

In the above-mentioned content sending apparatus, the execution processing insertion unit inserts, into the metadata, a description associated with processing of making the content reception apparatus execute at least one of copying and moving received data of content to a predetermined recording media.

In the above-mentioned content sending apparatus, the execution processing insertion unit inserts, into the metadata, a description associated with processing of making the content reception apparatus delete the data of content upon passing of a predetermined time after completion of reception of the content.

In the above-mentioned content sending apparatus, the sending of the content is executed as processing of content uploading specified by UPnP as Universal Plug and Play.

In the above-mentioned content sending apparatus, wherein the metadata attaching unit attaches the metadata as a part of an XML as extensible Markup Language statement to be sent to the content reception apparatus in accompaniment with action "CreateObject" and the execution processing insert-on unit generates a description associated with processing to be executed by the content reception apparatus by use of a preset XML tag and inserts the generated description as a part of the XML statement.

In carrying out the invention and according to a second embodiment thereof, there is provided a content sending method for content sending apparatus configured to send content to the content reception apparatus configured to receive sent content. This content sending method has the steps of: attaching information associated with metadata of the content to data of the content; inserting a description associated with processing to be executed by the content reception apparatus after reception of the content by the content reception apparatus has been completed into metadata to be attached to data of the content; and sending, to the content reception apparatus, the data of the content attached with the metadata with the description inserted in the execution processing insertion step.

In carrying out the invention and according to the second embodiment thereof there is provided a computer-readable program for making a content sending apparatus configured to send content to a content reception apparatus configured to receive sent content. This computer-readable programs has the steps of: controlling for attaching information associated with metadata of the content to data of the content; controlling for inserting a description associated with processing to be executed by the content reception apparatus after reception of the content by the content reception apparatus has been completed into metadata to be attached to data of the content; and controlling for sending, to the content reception apparatus, the data of the content attached with the metadata with the description inserted in the execution processing insertion step.

In the second embodiment of the invention, the information about the metadata of the content is attached to the content data by the content sending apparatus. When the reception of the content by the content reception apparatus has been completed, the description associated with the processing to be executed by the content reception apparatus is inserted in the metadata to be attached to the content data and the content data attached with the metadata Inserted with the description is sent to the content reception apparatus.

In carrying out the invention and according to a third embodiment there of, there is provided a content reception apparatus configured to receive content from a content sending apparatus. This content reception apparatus has a data reception unit configured to receive data of the content attached with metadata; a metadata analysis unit configured to analyze the metadata received by the data reception unit; and a processing execution unit configured to execute processing to be executed after completion of reception of the content on the basis of a result of the analysis by the metadata analysis unit.

The above-mentioned content reception apparatus further has a processing identification unit configured to identify content of processing to be executed after completion of reception of the content on the basis of a result of the analysis by the metadata analysis unit, wherein the processing execution unit executes the processing to be executed identified by the processing identification unit.

In the above-mentioned content reception apparatus, the processing identification unit further identifies a time at which the processing is executed and the processing execution unit executes the processing to be executed identified by the processing identification unit at the time identified by the processing identification unit.

In the above-mentioned content reception apparatus, the processing identification unit identifies, as content of the processing to be executed, at least one of copying and moving data of the received content to a predetermined recording media.

In the above-mentioned content reception apparatus, the processing identification unit identifies, as content of the processing to be executed, processing of deleting data of the content upon passing of a predetermined time after completion of reception of the content.

In the above-mentioned content reception apparatus, sending of the content is executed by the content sending apparatus as processing of content uploading specified by UPnP.

In the above-mentioned content reception apparatus, the metadata analysis unit analyzes a part of an XML statement to be sent to the content reception apparatus in accompaniment with action "CreateObject" and the processing identification unit identifies content of processing to be executed and a time at which the processing is executed after completion of the reception of the content on the basis of a description inserted as a part of the XML statement, the description generated by use of a preset XML tag.

In carrying out the invention and according to the third embodiment thereof, there is provided a content reception method for a content reception apparatus configured to receive content sent from a content sending apparatus. This content reception method has the steps of: receiving content attached with metadata; analyzing the received metadata; and executing processing to be executed after completion of reception of the content on the basis of a result of the analysis.

In carrying out the invention and according to the third embodiment thereof, there is provided a computer-readable program for making content reception apparatus configured to receive content from a content sending apparatus execute content reception processing. This computer-readable program has the steps of: controlling for receiving content attached with metadata; controlling for analyzing the received metadata; and controlling for executing processing to be executed after completion of reception of the content on the basis of a result of the analysis.

In the third embodiment of the invention, the content data attached with the metadata is received, the received metadata data is analyzed, and on the basis of a result of the analysis, the processing to be executed is executed after the completion of the reception of the above-mentioned content.

As described above and according to the invention, each of the networked devices can execute content-associated processing more easily than related-art technologies.

BRIEF DESCRIPTION OF THE DRAWINGS

FIG. 3 is a sequence diagram illustrating an example of processing of uploading content specified by UPnP;

FIG. 4 is a diagram illustrating an example of an XML statement that is generated by the personal computer shown in FIG. 1 to be sent to a storage server;

FIG. 5 is a diagram illustrating another example of an XML statement that is generated by the personal computer shown in FIG. 1 to be sent to a storage server;

FIG. 6 is a diagram illustrating still another example of an XML statement that is generated by the personal computer shown in FIG. 1 to be sent to a storage server;

DETAILED DESCRIPTION OF THE PREFERRED EMBODIMENTS

Figure 1:
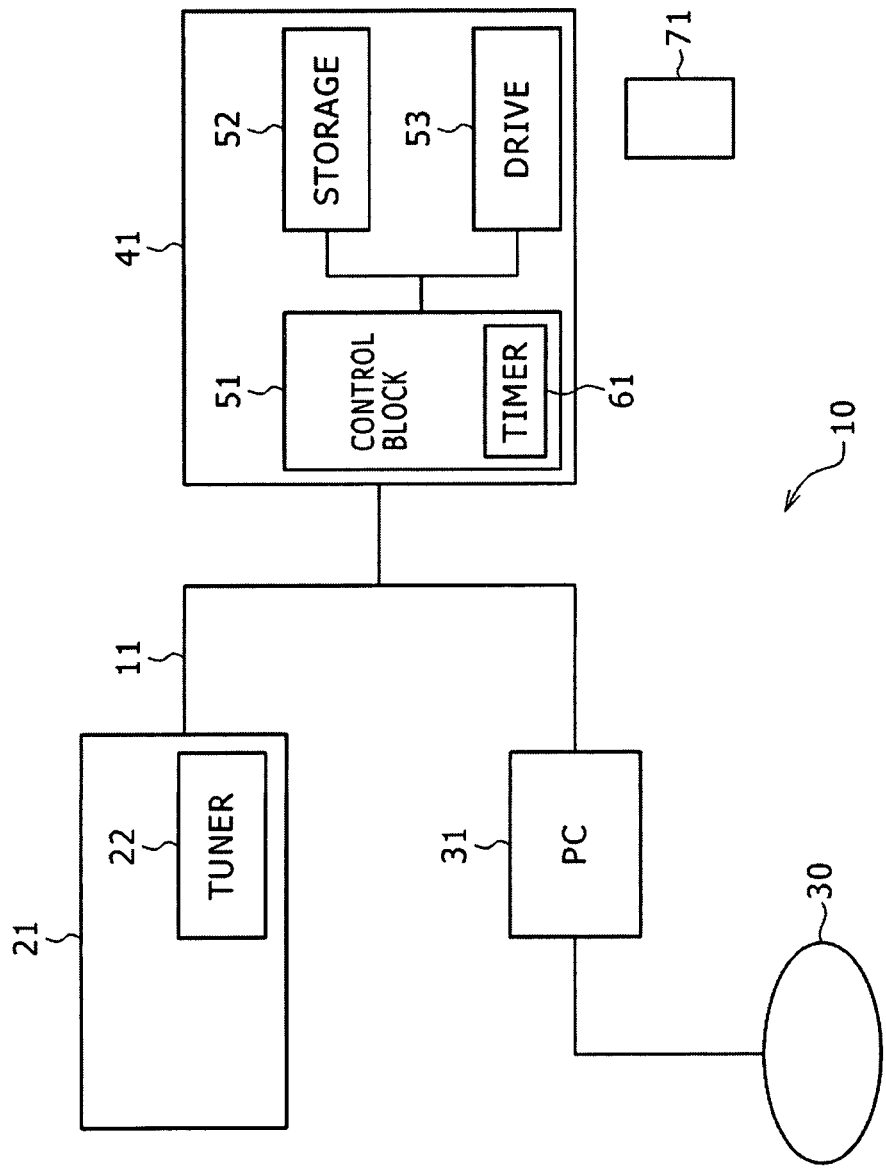
FIG. 1 is a block diagram illustrating an exemplary configuration of a content transmission system practiced as one embodiment of the invention.

Preferred embodiments of the present invention will hereinafter be described. Correspondences between constitutional requirements of the present invention and embodiments described in the detailed description of the invention are illustrated as follows. This description is to confirm that embodiments supporting the present invention are described in the detailed description of the invention. Therefore, even when there is an embodiment described in the detailed description of the invention but not described here as corresponding to a constitutional requirement, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

The content transmission system has a content sending apparatus for sending content and a content reception apparatus for receiving content sent by the content sending apparatus. This system is made up of the content sending apparatus and the content reception apparatus. The content sending apparatus has a metadata attaching unit (for example, a metadata-associated information acquisition block 501 and a CreateObject control block 503 shown in FIG. 7) configured to attach information associated with metadata of the content to data of the content; an execution processing insertion unit (for example, a nextaction control block 502 shown in FIG. 7) configured to insert a description associated with processing to be executed by the content reception apparatus after reception of the content by the content reception apparatus has been completed into metadata to be attached to data of the content; and a data sending unit (for example, a http-post control block 504 shown in FIG. 7) configured to send, to the content reception apparatus, the data of the content attached with the metadata with the description inserted by the execution processing insertion unit. The content reception apparatus has a data reception unit (for example, a content acquisition block 551 shown in FIG. 10) configured to receive the data of the content attached with the metadata; a metadata analysis unit (for example, a elements field analysis block 552 shown in FIG. 10) configured to analyze the metadata received by the data reception unit; and a processing execution unit (for example, a command execution control block 554 shown in FIG. 10) configured to execute processing to be executed after completion of reception of the content on the basis of a result of the analysis by the metadata analysis unit.

The content sending apparatus of the second embodiment of the invention is configured to send content to the content reception apparatus configured to receive sent content. This content sending apparatus has a metadata attaching unit (for example, the metadata-associated information acquisition block 501 and the CreateObject control block 503 shown in FIG. 7) configured to attach information associated with metadata of the content to data of the content; an execution processing insertion unit (for example, the nextaction control block 502 shown in FIG. 7) configured to insert a description associated with processing to be executed by the content reception apparatus after reception of the content by the content reception apparatus has been completed into metadata to be attached to data of the content; and a data sending unit (for example, the http-post control block 504 shown in FIG. 7) configured to send, to the content reception apparatus, the data of the content attached with the metadata with the description inserted by the execution processing insertion unit.

The content sending method of the second embodiment of the invention is for a content sending apparatus configured to send content to a content reception apparatus configured to receive sent content. This content sending method has the steps of: attaching information associated with metadata of the content to data of the content (for example, processing of steps S121 through S123 shown in FIG. 9); inserting a description associated with processing to be executed by the content reception apparatus after reception of the content by the content reception apparatus has been completed into metadata to be attached to data of the content (for example, processing of step S125 shown in FIG. 9); and sending, to the content reception apparatus, the data of the content attached with the metadata with the description inserted in the execution processing insertion step (for example, processing of step S104 shown in FIG. 8).

The content reception apparatus of the third embodiment of the invention is configured to receive content from a content sending apparatus. This content reception apparatus has a data reception unit (for example, the content acquisition block 551 shown in FIG. 10) configured to receive data of the content attached with metadata; a metadata analysis unit (for example, the elements field analysis block 552 shown in FIG. 10) configured to analyze the metadata received by the data reception unit; and a processing execution unit (for example, the command execution control block 554 shown in FIG. 10) configured to execute processing to be executed a processing execution unit configured to execute processing to be executed after completion of reception of the content on the basis of a result of the analysis by the metadata analysis unit.

The content reception method of the third embodiment of the invention is for a content reception apparatus configured to receive content sent from a content sending apparatus. This content reception method has the steps of: receiving content attached with metadata (for example, processing steps S204 and S205 shown in FIG. 11); analyzing the received metadata (for example, processing of step S221 shown in FIG. 12); and executing processing to be executed a processing execution unit (for example, processing of step S225 shown in FIG. 12) configured to execute processing to be executed after completion of reception of the content on the basis of a result of the analysis by the metadata analysis unit.

The following describes embodiments of the present invention with reference to the drawings accompanying thereto.

Now, referring to FIG. 1, there is shown an exemplary configuration of a content transmission system 10 practiced as one embodiment of the invention. The content transmission system 10 is a network system made up of devices that are compliant with the UPnP (Universal Plug and Play) specifications, for example.

As shown in FIG. 1, a television receiver 21, a personal computer (PC) 31, and a storage server 41 are interconnected via a network 11. It should be noted that the network 11 is a local area network (LAN), such as Ethernet (registered trademark), for example.

The television receiver 21 internally has a tuner 22. For example, the tuner 22 receives and decodes a digital broadcast signal with content data compressed by a predetermined data compression coding algorithm, such as MPEG2, to be broadcast and outputs the decoded image or audio data to a display monitor or a loudspeaker, not shown, for example. The television receiver 21 is also configured to send a broadcast signal received at the tuner 22 to the network 11 as content data, as necessary.

Figure 2:
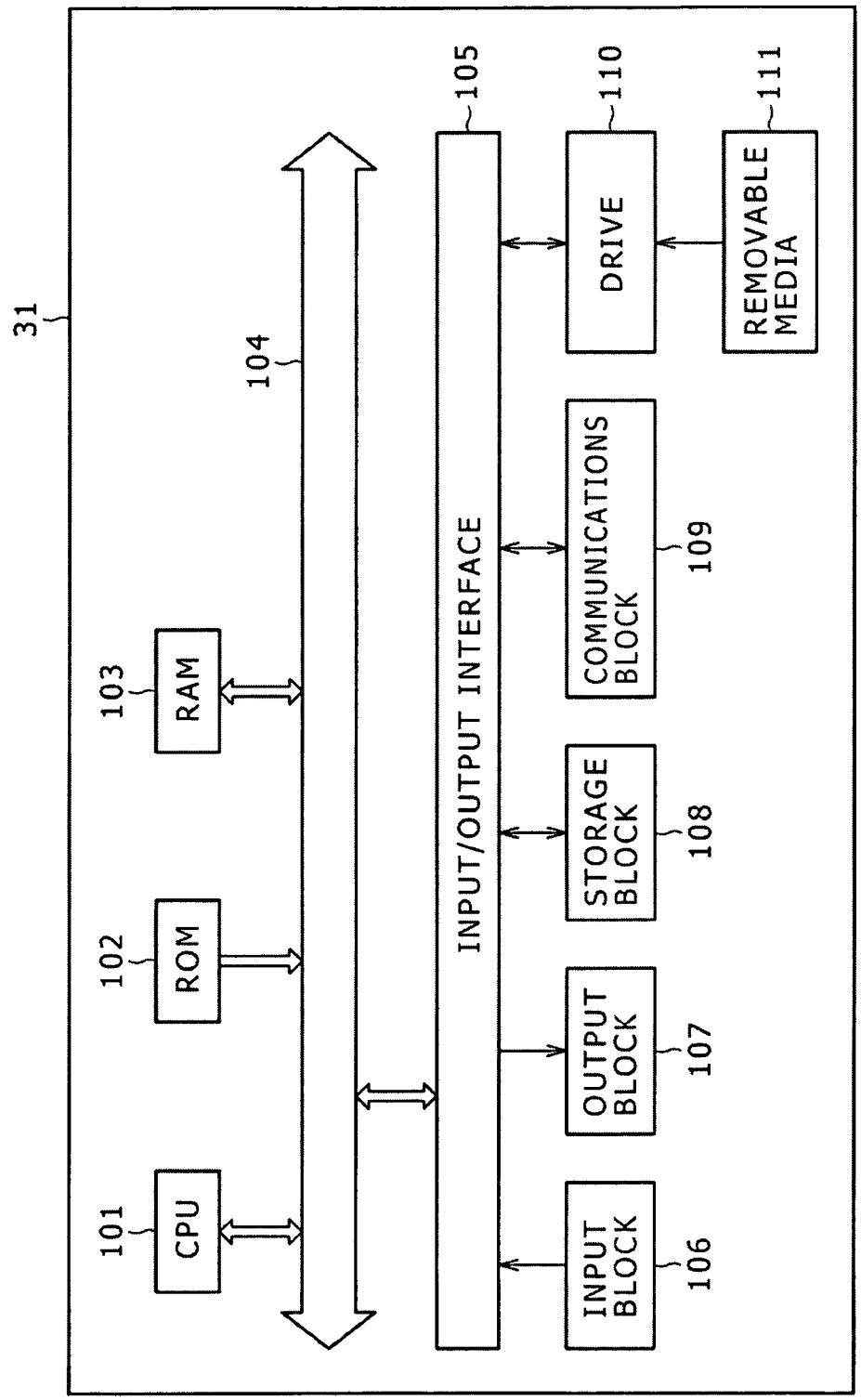
FIG. 2 is a block diagram illustrating an exemplary configuration of a personal computer shown in FIG. 1.

The personal computer 31 has a configuration as shown in FIG. 2 and executes predetermined information processing as instructed by software programs installed on the personal computer 31.

Namely, referring to FIG. 2, a CPU (Central Processing Unit) 101 executes various processing operations as instructed by computer programs stored in a ROM (Read Only Memory) 102 or loaded from a storage block 108 into a RAM (Random Access Memory) 103. In the RAM 103, data necessary for the CPU ;01 to execute various processing operations are also stored arbitrarily.

The CPU 101, the ROM 102, and the RAM 103 are interconnected via a bus 104. The bus 104 is also connected with an input/output interface 105.

The input/output interface 105 is connected with an input block 106 made up of a keyboard and a mouse, an output block 107 made up of a display monitor based on CRT (Cathode Ray Tube) or LCD (Liquid Crystal Display), and a loudspeaker, the storage block 108 based on hard disk drive, and a communications block 109 based on network interface card, such as a LAN card. The communications block 109 executes communications processing via the network 11 or a network 30.

The input/output interface 105 is also connected with a drive 110 as necessary, on which a removable media, such as a magnetic disk, an optical disk, a magneto-optical disk, or a semiconductor device, is loaded as necessary, computer programs read therefrom being installed into the storage block 108 as necessary.

The personal computer 31, connected to the network 30, such as the Internet, receives data streams of content compressively encoded by a predetermined data compression coding algorithm, such as MPEG2, from the network 30 and decodes the received data, outputting the resultant image or audio data to a display monitor or a loudspeaker, not shown. Also, the personal computer 31 sends the received content data to the network 11 as necessary.

The storage server 41, configured as a HDD recorder for example, receives content data from the television receiver 21 or the personal computer 31 to store in a storage 52 in the storage server 41.

The storage server 41 has a control block 51, the storage 52, and a drive 53. The control block 51 has a processor and a memory, for example, and controls the components of the storage server 41 as instructed by programs installed beforehand.

The control block 51 also contain a timer 61 and acquires the information about the clock counted by the timer 61 as necessary, thereby executing clock-based processing.

The storage 52 is made up of a HDD (Hard Disk Drive) for example and, under the control of the control block 51, records data, reads data, and delete recorded data, for example.

The drive 53 is configured such that a removable media 71 can be loaded thereon. Under the control of the control block 51, the drive 53 records data to the loaded removable media 71, reads data therefrom, and deletes data therefrom.

The removable media 71 is configured as a magnetic disk (including a floppy disk (trademark)), an optical disk (including a CD-ROM (Compact Disk-Read Only Memory) and a DVD (Digital Versatile Disk)), a magneto-optical disk (including an MD (Mini-Disk) (trademark)), and a semiconductor memory including a memory stick and is configured to be detachably loaded on the drive 53.

The memory stick is a type of flash memory card developed by Sony Corporation. The memory stick contains, in a plastic case, a flash memory element that is a type of EEPROM (Electrically Erasable and Programmable ROM) and allows the writing and reading of various kinds of data, such as image, audio, and music data. The memory stick also contains a controller configured for data control.

It should be noted that, in the content transmission system 10, the processing of sending content data from the television receiver 21 or the personal computer 31 to the storage server 41 and recording the this content data to the storage 52 of the storage server 41 is executed as the processing of uploading content specified by UPnP. Each device compliant with the use of UPnP can not only be networked for communication but also automatically detect and connect to other devices by use of the PnP functions without demanding the user to do complicated operations.

UPnP is a protocol group including IP (Internet Protocol) and TCP (Transmission Control Protocol) and UDP (User Datagram Protocol) on IP that are usable on the IEEE 802 network representative in the network communication based on Ethernet (trademark) of 10/100 BASE-T and data format specifications, thereby expanding the functions in Internet-standard communication (or TCP/IP communication).

In UPnP, the actual sending and reception of data are executed by the Internet-standard communications protocols of IP, TCP, and UDP.

In the content transmission based on UPnP, the devices concerned are divided into a media server that provides content data and a control point that functions as a control terminal device. The media server as referred to herein is equivalent to a device generally called a server in network systems, the storage server 41 shown in FIG. 1 for example.

The control point (or the control device) is capable of controlling each UPnP device connected to a network. The function of the control point can be installed on the media server. Also, the function of the control point can be installed on each device making up a network. Further, the function of the control point can be installed on particular devices making up a network. In the example shown in FIG. 1, the function of the control point is installed on the television receiver 21, the personal computer 31, and the storage server 41.

The function of the control point is largely divided into two functions of action and query. An action is executed by a method specified in the action information of service description. Executing an action allows the control point to operate a target. A query is used to take out a value of device information of service description. In the execution of an action or a query, a transport protocol called SOAP is used and XML is used for the expression thereof.

The media server has a function called CDS (Content Directory Service) that notifies the control point of a manner in which content is stored in the media server. CDS has two abstract objects called container and item that are equivalent to folder and file in Windows (trademark), an operating system provided by Microsoft Corporation.

The following describes the processing of uploading content specified by UPnP with reference to the sequence diagram shown in FIG. 3. The description will be made by use of an example in which content is uploaded from the personal computer 31 that is the control point to the storage server 41 that is the media server.

In step S11, the personal computer 31 executes an action "CreateObject" specified by the UPnP. Consequently, the information written in XML is sent to the storage server 41 to be received in step 331.

Having received action "CreateObject" in step S31, the storage server 41 sends a URL (Uniform Resource Locator) indicative of an area in which to store content data to the personal computer 31 in step 332, the URL being received in step S12.

In step S13, the personal computer 31 executes the processing of http-post specified by UPnP and sends the content data to the URL received in step S12.

In step S33, the storage server 41 receives the content data sent by the processing of step S13, storing the received content data into the storage 52.

Thus, the content is uploaded from the personal computer 31 (or the control point) to the storage server 41 (or the media server).

Referring to FIG. 4, there is shown a diagram illustrating an example of XML statement that is generated by the personal computer 31 (or the control point) to be sent to the storage server 41 (or the media server) when action "CreateObject" is executed. FIG. 4 shows an XML statement 200 for uploading content entitled "MPEG1 Sample Movie2" into container "dvdrec".

It should be noted that container "dvdrec" is managed by the storage server 41 as a logical storage area in the storage 52.

Lines 1 through 7 of the XML statement 200 describes command and parameters corresponding to "CreateObject", line 7 identifying container "dvdrec" that is upload destination.

A portion enclosed by a frame 210 is called an elements field. The elements field is a field in which the metadata to be attached to content to be uploaded is mainly written.

A portion enclosed by a frame 221 in the elements field is a declarative statement of XML description. A portion enclosed by a frame 222 is a description for identifying title "MPEG1 Sample Movie2" of the content to be uploaded. A portion enclosed by a frame 223 is a description for identifying a format of the content to be uploaded. In this example, it is described that this content is transmitted in the format of MPEG transport stream and compliant with a predetermined format defined by DLNA (Digital Living Network Alliance).

Sending the above-mentioned XML statement 200 from the personal computer 31 to the storage server 41 in accompaniment with action "CreateObject" allows the uploading of the content having title "MPEG1 Sample Movie2" to container "dvdrec".

The user can view the content uploaded as described above by reproducing on the storage server 41 and outputting the reproduced content data to a display monitor and a loudspeaker for example, not shown, of the storage server 41. It is also practicable to record the content uploaded to the storage server 41 to the removable media 71 and loading this removable media 71 on a portable display device to reproduce thereon.

Reproducing content on a portable display device demands the changing of image data compression coding algorithms, for example. Namely, the image data received by a television receiver for example is often compression encoded by MPEG2; however, the image data reproducible on portable display devices for example is often compression encoded by MPEG4, thereby demanding for the content uploaded to the storage server 41 to be compression encoded into a format reproducible on portable display devices and then recorded to the removable media 71.

Thus, if a content uploading user uploads content to a device, such as the storage server 41, for example, the uploaded content may often be recorded to a recording media, such as the removable media 71.

However, according to the processing specified by UPnP, the processing of uploading content and the processing of recording the uploaded content to a recording media demand separate operations, thereby increasing user load.

In order to circumvent this inconvenience, a description is inserted in the elements field of the XML statement to be generated by a control point in accompaniment with action "CreateObject" and sent to a media server, this description instructing the media server to execute the processing of copying (or moving) the uploaded content to the removable media 71.

To be more specific, an XML tag for instructing the media server to execute predetermined processing is defined beforehand and a command to be executed by the media server is inserted in the elements field at a predetermined position along with this tag. Then, after receiving the XML statement of "CreateObject", the media server analyses the elements field to execute the directed processing. This configuration allows the user only to upload content, which is then automatically copied (or moved) to the removable media 71.

Referring to FIG. 5, there is shown a diagram illustrating an example of an XML statement containing a description for instructing a media server to execute the copying of uploaded content to the removable media 71. Like the XML statement 200 shown in FIG. 4, an XML statement 300 shown in FIG. 5 is generated by the personal computer 31 in accompaniment with action "CreateObject" to be sent to the storage server 41. The XML statement 300 is for uploading content having title "MPEG1 Sample Movie2" to container "dvdrec".

The descriptions on lines 1 through 7 of the XML statement 300 shown in FIG. 5 are substantially the same as the descriptions on lines 1 through 7 of the XML statement 200 shown in FIG. 4. The portions and descriptions enclosed by a frame 310, and frames 221 through 223 shown in FIG. 5 are substantially the same as those enclosed by the frame 210 and frames 221 through 223 shown in FIG. 4, so that detail description thereof will be skipped.

Unlike the XML statement 200 shown in FIG. 4, the XML statement 300 shown in FIG. 5 has a description enclosed by the frame 331 one line before the portion enclosed by the frame 323. In the portion enclosed by the frame 331, <private : nextaction>copy-to-memorystick</private : nextaction> is described.

This description is indicative that command "copy-to-memorystick" has been issued by XML tag "private : nextaction" for instructing the media server to execute predetermined processing. When this command is executed, the uploaded content data is copied to a memory stick that is the removable media 71.

It should be noted that the above-mentioned XML tag "private: nextaction" is one example of XML tags for instructing the media server to execute predetermined processing; therefore, it is also practicable to define another XML tag as am XML tag for instructing the media server to execute predetermined processing.

Sending the above-mentioned XML statement 300 from the personal computer 31 to the storage server 41 in accompaniment with action "CreateObject" allows the uploading of content having title "MPEG1 Sample Movie2" to container "dvdrec" and the automatic copying of the uploaded content to the removable media 71.

In the above, the example of automatically copying uploaded content to the removable media 71 has been described. It is also practicable to described the portion enclosed by the frame 331 as <private : nextaction>move-to-memorystick</private : nextaction> so as to automatically move the uploaded content to the removable media 71.

It should be noted that the command given by XML tag "private : nextaction" may be executed immediately after the completion of content uploading; however, it is also practicable to execute the command when a predetermined time is found passed on the basis of clock information supplied from the timer 61, for example.

For example, it is also practicable to delete the content of the storage 52 from the container when a predetermined time has passed after the completion of uploading to the storage server 41.

Referring to FIG. 6, there is shown an example of an XML statement containing a description for instructing a media server to execute the deletion of the uploaded content from a container when a predetermined time has passed after the completion of the uploading. Like the XML statement 200 shown in FIG. 4, an XML statement 400 shown in the figure is an XML statement that is generated by the storage server 41 to be sent to the storage server 41 in accompaniment with action "CreateObject". As with the XML statement 200, the XML statement 400 uploads content having title "MPEG1 Sample Movie2" to container "dvdrec".

The descriptions on lines 1 through 7 of the XML statement 400 shown in FIG. 6 are substantially the same as those on lines 1 through 7 of the XML statement 200 shown in FIG. 4. The portions and descriptions enclosed by a frame 410, and frames 421 through 423 shown in FIG. 6 are substantially the same as those enclosed by the frame 210 and frames 221 through 223 shown in FIG. 4, so that detail description thereof will be skipped.

Unlike the XML statement 200 shown in FIG. 4, the XML statement 400 shown in FIG. 6 has a description enclosed by the frame 431 one line before the portion enclosed by the frame 423. In the portion enclosed by the frame 331, <private : nextaction>lifetime=24hours<private : nextaction> is described.

The above-mentioned description is indicative that command "lifetime=24hours" has been issued by XML tag "private : nextaction" for instructing the media server to execute predetermined processing. The execution of this command deletes the uploaded content data from the container of the storage 52 when 24 hours have passed since the completion of the uploading.

Sending the above-mentioned XML statement 400 from the personal computer 31 to the storage server 41 in accompaniment with action "CreateObject" allows the uploading of the content having title "MPEG1 Sample Movie2" to container "dvdrec" and the automatic deletion of the uploaded content when a predetermined time has passed.

Figure 7:
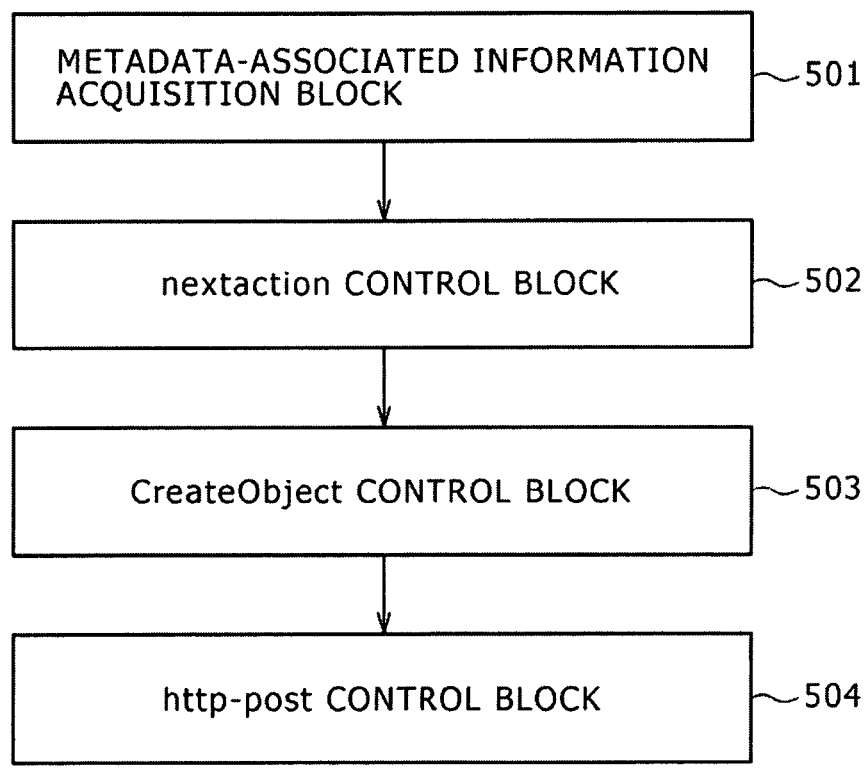
FIG. 7 is a block diagram illustrating an exemplary functional configuration of software that is executed by the CPU of the personal computer shown in FIG. 1.

Referring to FIG. 7, there is shown an exemplary functional configuration of software that is executed by the CPU 101 of the personal computer 31 to control the processing associated with the uploading of content.

In FIG. 7, a metadata-associated information acquisition block 501 acquires the information about the metadata of the content to be uploaded. The metadata of the content may be acquired by the user through the input block 106 or by the analysis of the content data, for example.

A nextaction control block 502 controls the description of the above-mentioned XML tag "private : nextaction". For example, after the completion of the uploading of content through the input block 106, the nextaction control block 502 determines whether predetermined processing (copying or move or deletion of content data for example) to be executed by the storage server 41 has been specified by the user. If, after the completion of the uploading of content, the predetermined processing to be executed by the storage server 41 is found specified by the user, then the nextaction control block 502 generates a description for instructing the media server to execute the predetermined processing by use of XML tag "private : nextaction".

A CreateObject control block 503 generates an XML statement to be sent from the personal computer 31 to the storage server 41 in accompaniment with action "CreateObject" and controls the sending of the created XML statement. In addition, the CreateObject control block 503 inserts the description using tag "private : nextaction" generated by the nextaction control block 502 into the elements field of the XML statement at a specified position as described above.

An http-post control block 504 controls the execution of the http-post processing specified by UPnP that is the processing (shown in step S13 of FIG. 3) for sending content data to the storage server 41.

Figure 8:
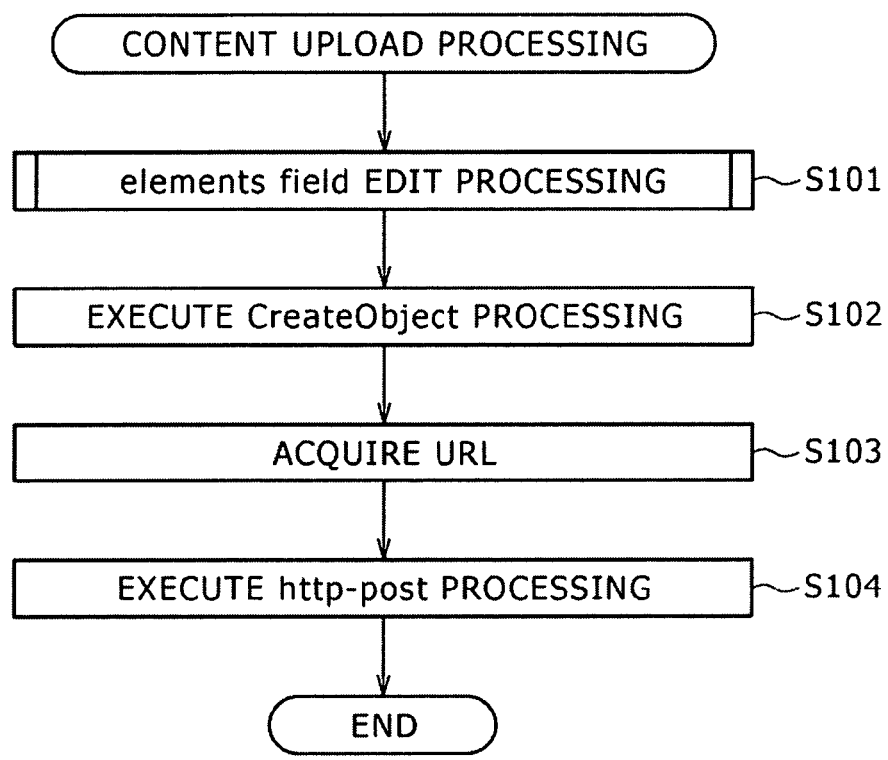
FIG. 8 is a flowchart indicative of an example of content upload processing.

The following describes an example of content upload processing to be executed by the personal computer 31 with reference to the flowchart shown in FIG. 8. This processing is executed when the uploading of content is specified by the user through the input block 106, for example.

In step S101, the metadata-associated information acquisition block 501 and the nextaction control block 502 execute elements field edit processing to be described later with reference to the flowchart shown in FIG. 9. Consequently, in accompaniment with action "CreateObject", the description of the elements field of the XML statement to be sent from the personal computer 31 to the storage server 41 is generated.

In step S102, the CreateObject control block 503 executes action "CreateObject". This processing, corresponding to the action of step S11 shown in FIG. 3, in which the XML statement described with reference to FIGS. 4 through 6 is sent to the storage server 41.

In step S103, the CreateObject control block 503 receives the information sent from the storage server 41 to acquire the URL indicative of a storage area in which the content data is stored. This processing corresponds to the processing of step S12 shown in FIG. 3.

In step S104, the http-post control block 504 executes the http-post processing specified by UPnP, sending the content data to the URL received in the processing of step S103. This processing corresponds to the processing of S13 shown in FIG. 3.

Thus, the content upload processing is executed by the personal computer 31.

Figure 9:
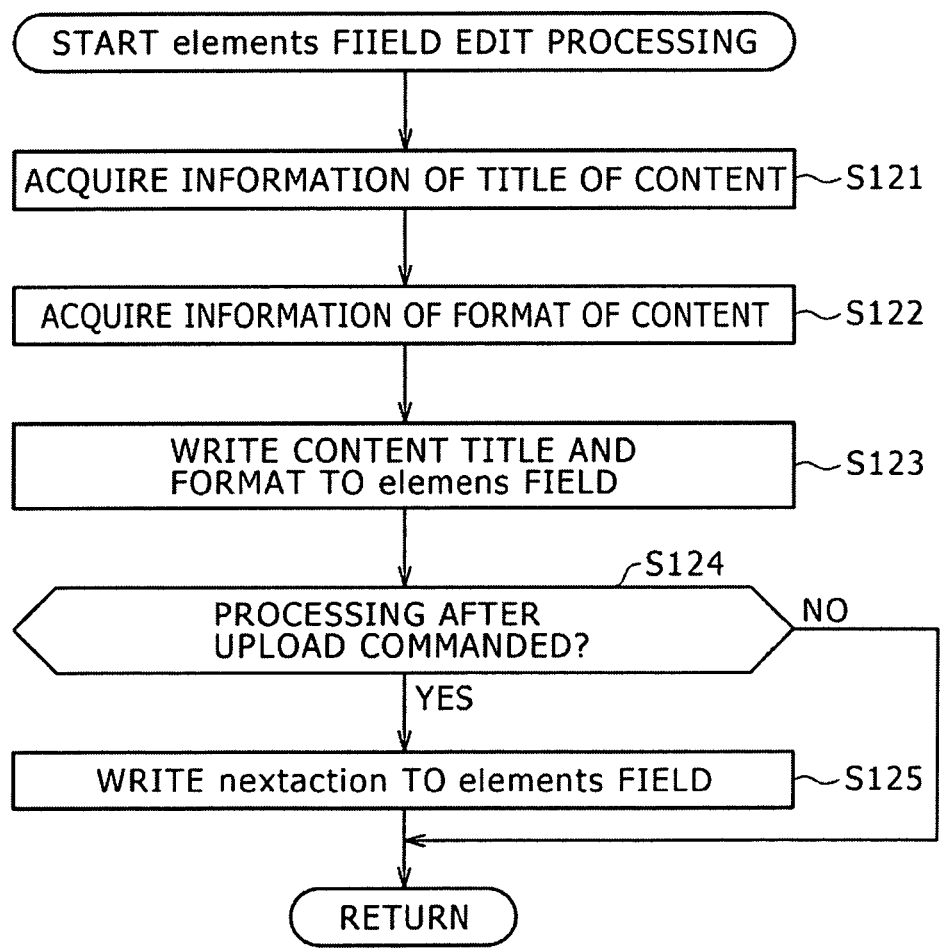
FIG. 9 is a flowchart indicative of an example of elements-field edit processing.

The following describes details of the elements field edit processing of step S101 shown in FIG. 8 with reference to the flowchart shown in FIG. 9.

In step S121, the metadata-associated information acquisition block 501 acquires the information about the title of the content to be uploaded. At this moment, information "MPEG1 Sample Movie2" is obtained as the title of the content, for example.

In step S122, the metadata-associated information acquisition block 501 acquires the information about the format of the content to be uploaded. Acquired at this moment is the information for identifying that the content is transmitted in the MPEG transport stream format and is compliant with a predetermined format defined in DLNA (Digital Living Network Alliance), for example.

In step S123, the metadata-associated information acquisition block 501 writes the title of the content acquired in step S121 and the information for identifying the format of the content acquired by the processing in step S122 to the elements field. At this moment, the descriptions of the portion enclosed by the frame 222 and the portion enclosed by the frame 223 shown in FIG. 4, a portion enclosed by a frame 322 and a portion enclosed by a frame 323 shown in FIG. 5, and a portion enclosed by a frame 422 and a portion enclosed by a frame 423 are generated.

In step S124, the nextaction control block 502 determines whether the processing to be executed after uploading has been instructed or not. At this moment, after the completion of content uploading by the user, it is determined whether the storage server 41 is instructed to copy (or move) the uploaded content to the removable media 71 or deleting the uploaded content therefrom, for example. If such a command is found entered by the user through the input block 106, for example, then the procedure goes to step S125.

In step S125, the nextaction control block 502 writes the information for instructing the storage server 41 to execute the processing specified in step S124 to the elements field by use of XML tag "private : nextaction". For example, if, after the completion of the content uploading, the storage server 41 is found instructed to copy the content data to the removable media 71, then the description of the portion enclosed by the frame 331 shown in FIG. 5 is generated. If, after the completion of the content uploading, the storage server 41 is found instructed to delete the content data from the removable media 71 after the passing of a predetermined time (24 hours for example) in step S124, then the description of the portion enclosed by the frame 431 shown in FIG. 6 is generated, for example.

It should be noted that if the processing to be executed after the uploading is found not instructed in step S124, then the processing of step S125 is skipped.

Thus, the elements field is edited.

Figure 10:
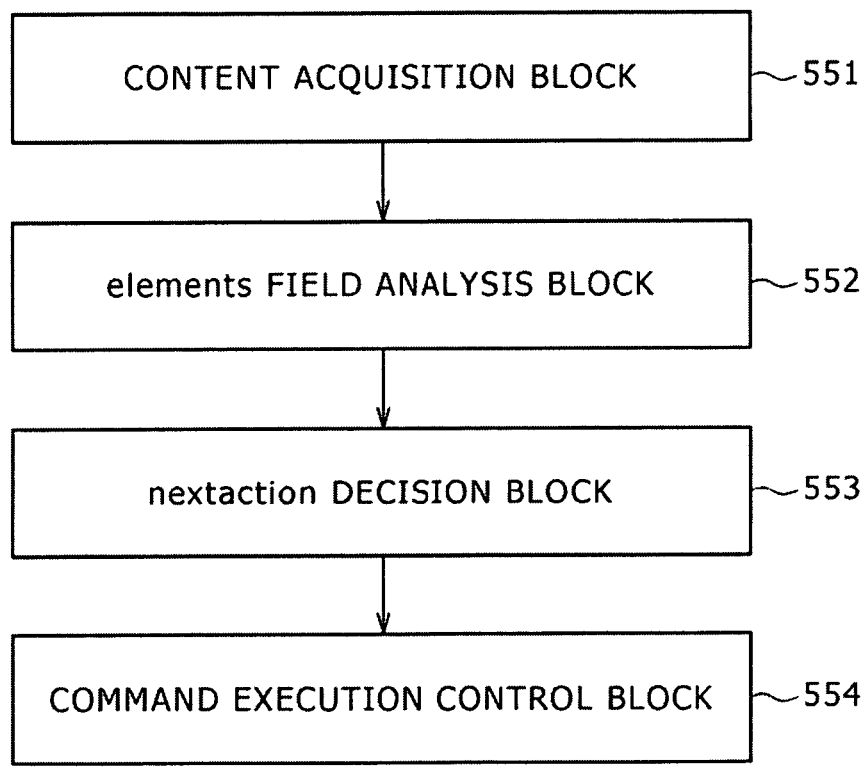
FIG. 10 is a block diagram illustrating an exemplary functional configuration of software that is executed by a control block of a storage server.

Referring to FIG. 10, there is shown an exemplary functional configuration of software that is executed by the control block 51 of the storage server 41 to control the processing associated with the acquisition of the content uploaded from another device.

In FIG. 10, if a request comes from another device, such as the personal computer 31 for the uploading of content, a content acquisition block 551 controls the execution of the processing of sending the information about a URL in which the requested content is stored and the receiving of content sent by the http-post processing, for example.

An elements field analysis block 552 analyzes the content of the elements field in an XML statement received from another device in accompaniment with action "CreateObject".

A nextaction decision block 553 determines on the basis of an analysis result of the elements field analysis block 552 whether there is any processing to be executed after the completion of content uploading.

If the processing to be executed after the completion of content uploading is found by the nextaction decision block 553, then a command execution control block 554 executes the processing corresponding to that command.

Figure 11:
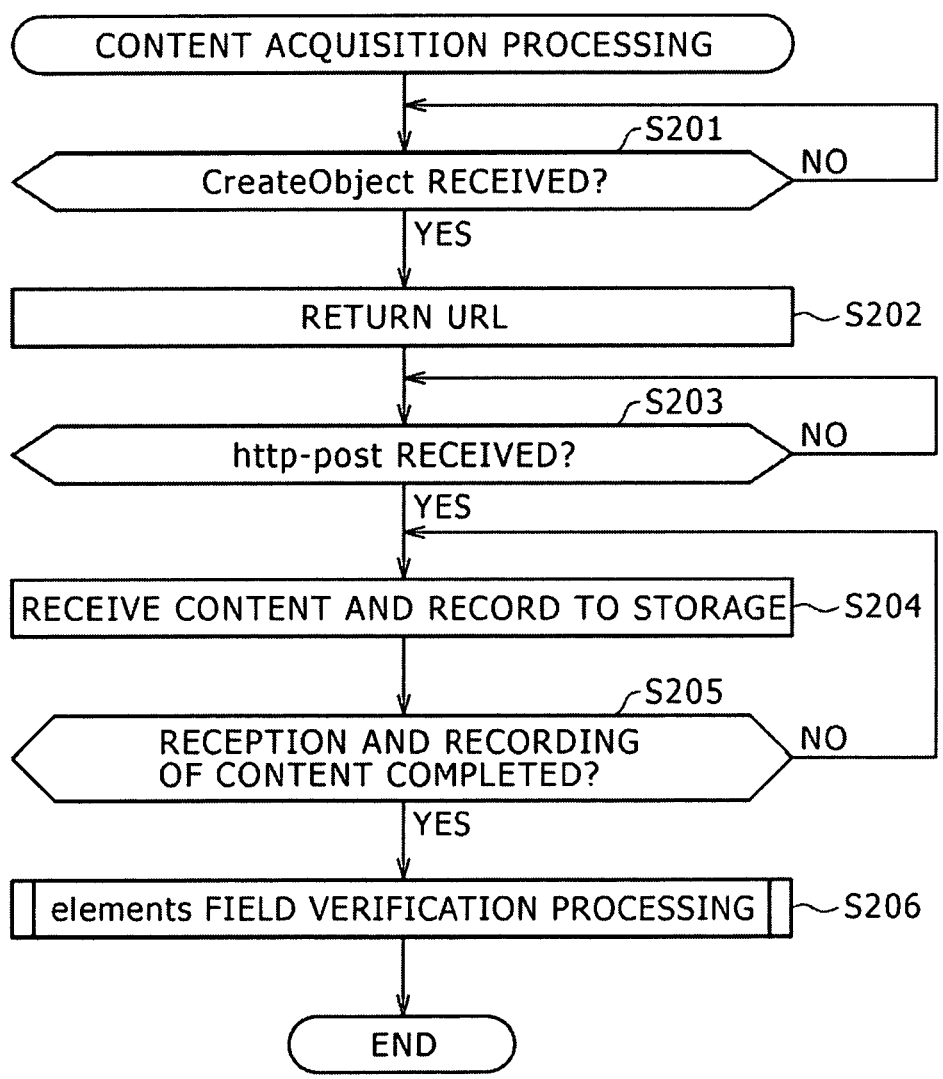
FIG. 11 is a flowchart indicative of an example of content acquisition processing.

The following describes the content acquisition processing to be executed by the storage server 41 with reference to the flowchart shown in FIG. 11.

In step S201, the content acquisition block 551 determines whether the XML statement has been sent from the personal computer 31 in accompaniment with action "CreateObject" and waits until the XML statement is found received.

If the XML statement is found received in step S201, then the procedure goes to step S202, in which the content acquisition block 551 sends the URL indicative of a storage area for storing the content data to the personal computer 31. This processing corresponds to the processing of step S32 shown in FIG. 3.

In step S203, the content acquisition block 551 determines whether the http-post has been received from the personal computer 31 and waits until the http-post is found received.

If the http-post is found received from the personal computer 31 in step S203, then the content acquisition block 551 goes to step S204, in which the content acquisition block 551 receives the content data and records the received content data to the container of the storage 52.

In step S205, the content acquisition block 551 determines whether the reception and recording of the content data uploaded by the personal computer 31 have been completed. If the reception and recording are found not completed, then the procedure returns to step S204 to repeat the above-mentioned processing therefrom.

It should be noted that the processing of step S204 and the processing of S205 correspond to the processing of step S33 shown in FIG. 3.

If the reception and recording of the content data uploaded from the personal computer 31 are found completed in step S205, then the procedure goes to step S206.

In step S206, the elements field analysis block 552, the nextaction decision block 553, and the command execution control block 554 execute elements field verification processing to be described later with reference to FIG. 12. Consequently, the execution based on the description of the elements field is controlled.

Thus, the content is acquired.

Figure 12:
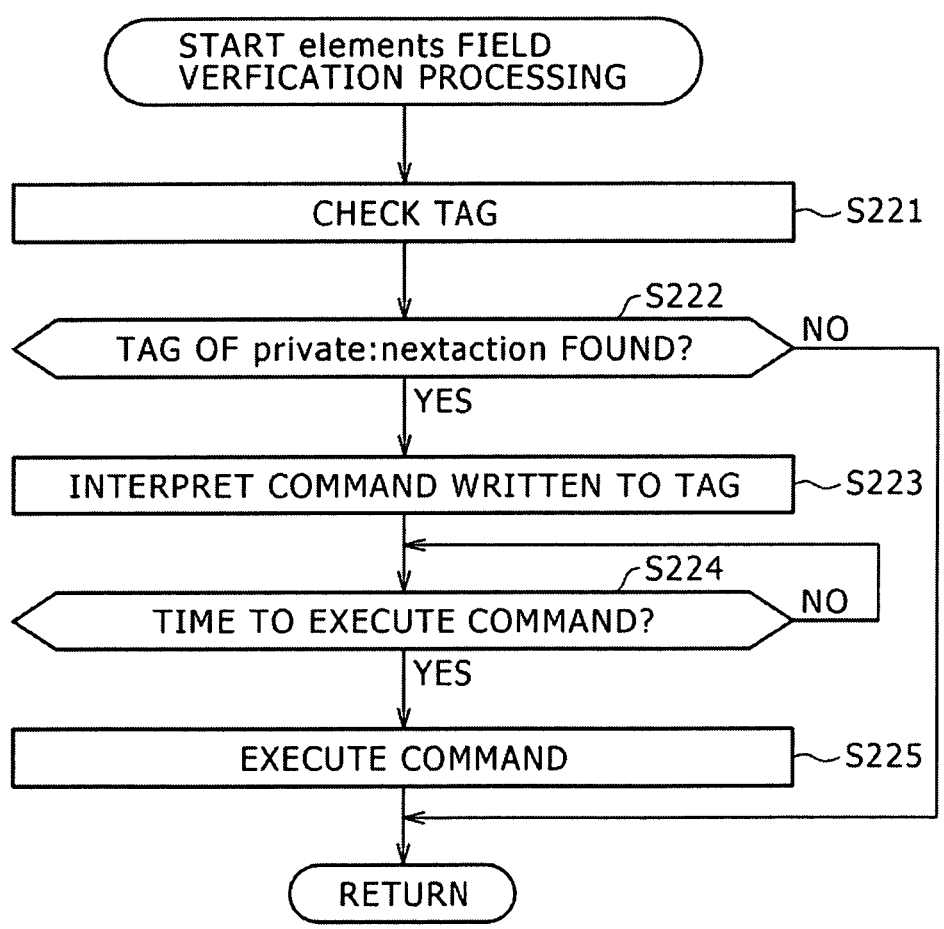
FIG. 12 is a flowchart indicative of an example of elements-field verification processing.

The following describes details of the elements field verification processing of step S206 shown in FIG. 11 with reference to the flowchart shown in FIG. 12.

In step S221, the elements field analysis block 552 checks the tag of the XML in the elements field.

In step S222, the nextaction decision block 553 determines on the basis of a result of the processing of step S221 whether tag "private : nextaction" of the XML has been found. If tag "private : nextaction" of the XML is found, the procedure goes to step S223.

In step S223, the nextaction decision block 553 interprets the command written by use of tag "private nextaction".

For example, if
<private : nextaction>copy-to-memorystick</private : nextaction>
is written, then it is interpreted that the processing of copying the content data recorded to the storage 52 to the removable media 71 after the completion of the content uploading, namely, after the reception and recording of the content data uploaded from the personal computer 31 are found completed in step S205 shown in FIG. 11.

For example, if
<private : nextaction>lifetime=24hours</private : nextaction>
is written, then it is interpreted that the processing of deleting the content data from the storage 52 is executed 24 hours after the reception and recording of the content data uploaded from the personal computer 31 are found completed after the completion of content uploading, namely, in step S205 shown in FIG. 11.

In step S224, the command execution control block 554 determines whether a time has come to execute the processing interpreted in step S223 and waits until it is determined that the has come. At this moment, it is determined on the basis of the information about the clock supplied from the timer 61 whether a time has come for executing the processing interpreted in step S223, for example. It should be noted that if no time for executing the processing is specified in the processing interpreted in step S223, for example, then the processing of step S224 may be skipped.

If the time for executing the processing is found reached in step S224, then the procedure goes to step S225, in which the command execution control block 554 executes the processing interpreted in step 3223.

At this moment, the processing of copying (or moving) the content data from the storage 52 to the removable media 71 or the processing of deleting the content data from the storage 52 are executed.

Thus, the processing on the basis of the description of the elements field is executed.

In the above, an example in which content is uploaded from the personal computer 31 to the storage server 41 has been described. In the uploading of content data from the television receiver 21 to the storage server 41, substantially the same upload processing is executed. Namely, sending the XML statement 300 shown in FIG. 5 or the XML statement 400 shown in FIG. 6 from the television receiver 21 to the storage server 41 in accompaniment of action "CreateObject" allows the uploading of content having title "MPEG1 Sample Movie2" to container "dvdrec" and the automatic execution of the processing of copying or moving the uploaded content to the storage server 41 or the deleting the uploaded content therefrom.

Namely, the tuner 22 of the television receiver 21 may be configured to have a processor and a memory as with the personal computer 31 and software having substantially the same functional configuration as shown in FIG. 7 may be installed to execute the above-mentioned processing described above with reference to FIGS. 8 and 9.

The above-mentioned configuration allows, in receiving broadcast content by a television receiver and uploading the received broadcast content, for example, the automatic execution of copying or moving content to a removable media after uploading or deleting content after passing of a predetermined time, for example.

In the above-described examples, the destination (or the sink) is the storage server 41; however, it is also practicable that content is uploaded to the television receiver 21 or the personal computer 31, for example.

Further, it is also practicable to upload content from the storage server 41 to another device.

In the above-described examples, the processing of content copying or moving or deletion is automatically executed after the completion of content uploading; however, it is also practicable to execute other processing, such as content reproduction and compression coding after the completion of content uploading, for example.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Programs to be executed by the CPU (the CPU 101 or the processor incorporated in the control block 51, for example) of a computer are provided in removable media that is package media, such as a magnetic disk (including a floppy disk (trademark)), an optical disk (including a CD-ROM (Compact Disk-Read Only Memory) and a DVD (Digital Versatile Disk)), a magneto-optical disk (including an MD (Mini-Disk) (trademark)), and a semiconductor memory including a memory stick or via wired or wireless transmission media, such as local area networks, the Internet, or digital satellite broadcasting, for example.

These programs can be installed by loading the removable media in which these programs are stored onto the drive. Also, the programs can be installed by receiving via wireless transmission media or a wireless LAN interface or via wired transmission media. Otherwise, the programs can be installed in the ROM for example beforehand.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

What is claimed is:

1. A content transmission system having a content sending apparatus for sending content and a content reception apparatus for receiving said content, said content sending apparatus including:

a first memory storing a first program; and
a first processor configured to execute the first program to cause the content sending apparatus to perform a first method, the first method comprising:
attaching content identifying information associated with metadata of said content to data of said content, inserting a command, to be executed by said content reception apparatus after reception of said content by said content reception apparatus has been completed, into said metadata to be attached to said data of said content, and sending said data of said content, attached with both content identifying information associated with said metadata, and said inserted command, to a content reception apparatus storage location specified by a URL received from said content reception apparatus, and said content reception apparatus including:

a second memory storing a second program; and a second processor configured to execute the second program to cause the content reception apparatus to perform a second method, the second method comprising:

receiving said data of said content, attached with both content identifying information associated with said metadata and said inserted command, at the storage location specified by the URL sent to said content sending apparatus, and analyzing said metadata, and executing said command after completion of reception of said content and on the basis of a result of the analysis of said metadata, and identifying a time in said metadata at which said command is to be executed and said command is executed at this time, wherein the content of said command includes deleting data of the received content upon passing of a predetermined time after completion of reception of said content, wherein said command causes said content reception apparatus to execute at least one of copying and moving said data of said content to a predetermined recording media identified in the command.

2. A content sending apparatus for sending content to a content reception apparatus for receiving said content, comprising:

a memory storing a program; and a processor configured to execute the program to cause the content sending apparatus to perform a method, the method comprising:

attaching content identifying information associated with metadata of said content to data of said content;

inserting a command to be executed by said content reception apparatus after reception of said content by said content reception apparatus has been completed, into said metadata to be attached to said data of said content; and sending said data of said content attached with both content identifying information associated with said metadata, and said inserted command, to a content reception apparatus storage location specified by a URL received from said content reception apparatus, and sending a time in said metadata at which said command is to be executed and said command is executed at this time, wherein the content of said command includes deleting data of the received content upon passing of a predetermined time after completion of reception of said content, wherein said command causes said content reception apparatus to execute at least one of copying and moving said data of said content to a predetermined recording media identified in the command.

3. The content sending apparatus according to claim 2, wherein the command causes said content reception apparatus to delete said data of said content upon passing of a predetermined time after completion of reception of said content.

4. The content sending apparatus according to claim 2, wherein the sending of said content is executed as processing of content uploading specified by UPnP as Universal Plug and Play.

5. The content sending apparatus according to claim 4, wherein said metadata is attached as a part of an Extensible Markup Language (XML) statement to be sent to said content reception apparatus in accompaniment with action "CreateObject", and the command is generated by use of a preset XML tag and inserted as a part of said XML statement.

6. A content sending method for a content sending apparatus configured to send content to a content reception apparatus configured to receive said content, comprising the steps of:

attaching content identifying information associated with metadata of said content to data of said content;

inserting a command to be executed by said content reception apparatus after reception of said content by said content reception apparatus into said metadata to be attached to said data of said content; and sending said data of said content, attached with both content identifying information associated with said metadata, and said inserted command, to a content reception apparatus storage location specified by a URL received from said content reception apparatus, and sending a time in said metadata at which said command is to be executed and said command is executed at this time, wherein the content of said command includes deleting data of the received content upon passing of a predetermined time after completion of reception of said content, wherein said inserted command causes said content reception apparatus to execute at least one of copying and moving said data of said content to a predetermined recording media identified in the command.

7. A non-transitory, computer-readable medium storing a program that, when executed by at least one processor, causes the at least one processor to perform a method for a content sending apparatus to send content to a content reception apparatus configured to receive said content, the method comprising the steps of:

attaching content identifying information associated with metadata of said content to data of said content;

inserting a command to be executed by said content reception apparatus after reception of said content by said content reception apparatus has been completed into said metadata to be attached to said data of said content; and sending said data of said content attached with both content identifying information associated with said metadata, and said inserted command, to a content reception apparatus storage location specified by a URL received from said content reception apparatus, and sending a time in said metadata at which said command is to be executed and said command is executed at this time, wherein the content of said command includes deleting data of the received content upon passing of a predetermined time after completion of reception of said content, wherein said inserted command causes said content reception apparatus to execute at least one of copying and moving said data of said content to a predetermined recording media identified in the command.

8. A content reception apparatus configured to receive content from a content sending apparatus, comprising:
- a memory storing a program; and
- a processor configured to execute the program to cause the content reception apparatus to perform a method, the method comprising:
  - receiving data of said content, attached with both content identifying information associated with metadata, and a command, to be executed by said content reception apparatus after reception of said content by said content reception apparatus, at a storage location specified by a URL sent to said content sending apparatus, and;
  - analyzing said metadata; and
  - executing said command on the basis of a result of the analysis of said metadata, and
  - identifying a time in said metadata at which said command is to be executed and said command is executed at this time,
- wherein the content of said command includes deleting data of the received content upon passing of a predetermined time after completion of reception of said content,
- wherein said command causes said content reception apparatus to execute at least one of copying and moving said data of said content to a predetermined recording media identified in the command.

9. The content reception apparatus according to claim 8, wherein the method further comprises
- identifying content of said command on the basis of said result of the analysis of said metadata.

10. The content reception apparatus according to claim 9, wherein:
- the analysis of said metadata includes analyzing a part of an XML statement received from said content sending apparatus in accompaniment with action "CreateObject", and
- the identifying of the content of said command and a time at which said command is executed after completion of the reception of said content is based on the part of said XML statement.

11. A content reception method for a content reception apparatus configured to receive content sent from a content sending apparatus, comprising the steps of:

receiving content data, attached with both content identifying information associated with metadata, and a command, to be executed by said content reception apparatus after reception of said content by said content reception apparatus, at a storage location specified by a URL sent to said content sending apparatus, and;
analyzing said received metadata; and
executing said command after completion of reception of said content on the basis of a result of said analysis, and
identifying a time in said metadata at which said command is to be executed and said command is executed at this time,
wherein the content of said command includes deleting data of the received content upon passing of a predetermined time after completion of reception of said content,
wherein said command causes said content reception apparatus to execute at least one of copying and moving said content to a predetermined recording media identified in the command.

12. A non-transitory, computer-readable medium storing a program that, when executed by at least one processor, causes the at least one processor to perform a method for a content reception apparatus to receive content from a content sending apparatus and execute content reception processing, the method comprising the steps of:
- receiving content data, attached with both content identifying information associated with metadata, and a command, to be executed by said content reception apparatus after reception of said content by said content reception apparatus, at a storage location specified by a URL sent to said content sending apparatus, and;
- analyzing said received metadata; and
- executing said command after completion of reception of said content and on the basis of a result of said analysis, and
- identifying a time in said metadata at which said command is to be executed and said command is executed at this time,
- wherein the content of said command includes deleting data of the received content upon passing of a predetermined time after completion of reception of said content,
- wherein said command causes said content reception apparatus to execute at least one of copying and moving said content to a predetermined recording media identified in the command.

* * * * *